Dec. 14, 1943.    R. P. FRYE    2,336,986
CUTTING TOOL
Filed Aug. 9, 1941    2 Sheets-Sheet 2

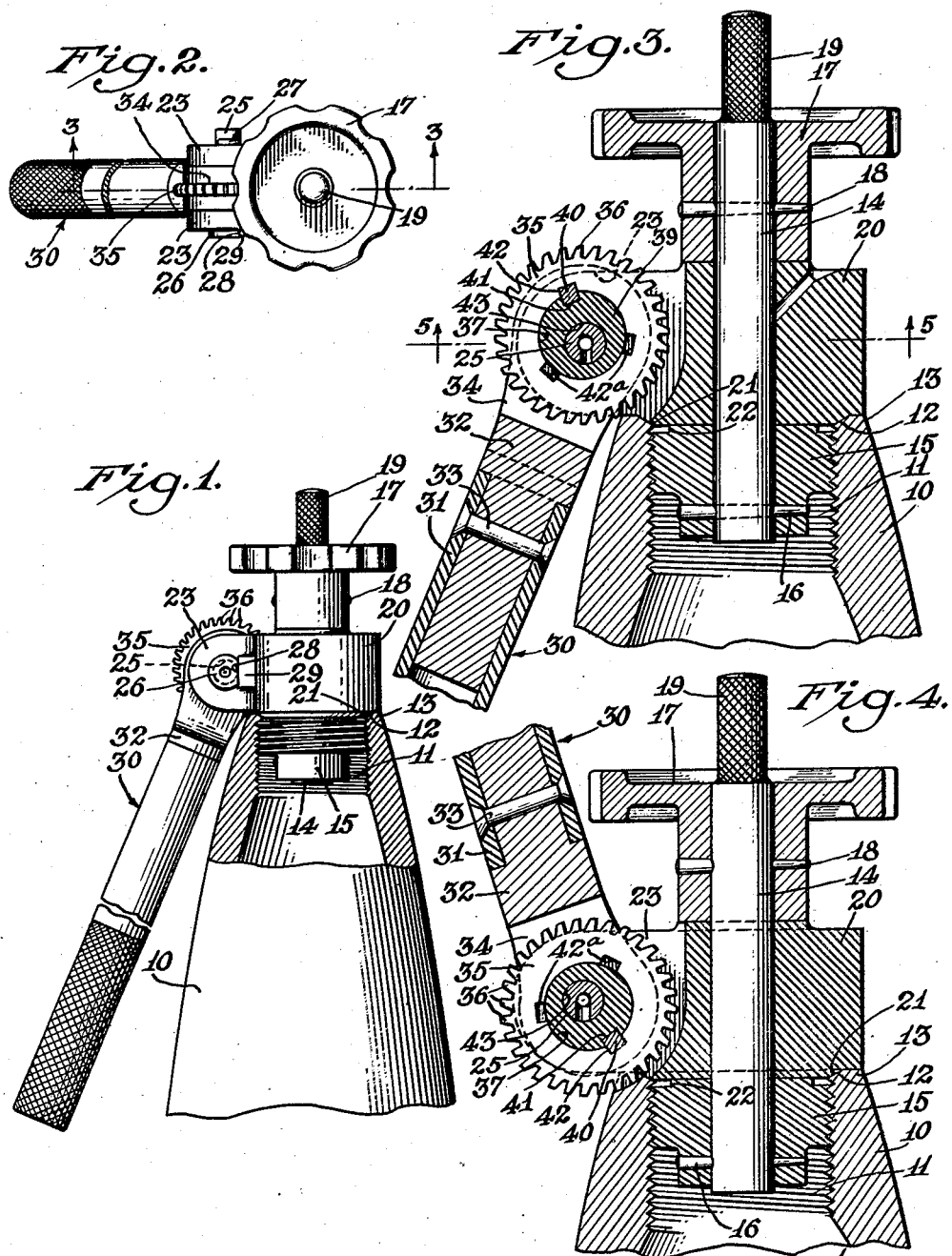

Inventor
Raymond P. Frye
BY
Attorneys.

Patented Dec. 14, 1943

2,336,986

UNITED STATES PATENT OFFICE 2,336,986

CUTTING TOOL

Raymond P. Frye, Chicago, Ill.

Application August 9, 1941, Serial No. 406,143

10 Claims. (Cl. 90—12)

The invention relates to cutting tools and more particularly to tools for cutting recesses or notches in peripheral portions of generally cylindrically shaped members such as shell casings.

In the manufacture of certain cylindrical members it is sometimes necessary to cut a recess or notch in a peripheral marginal portion of the member. Examples of articles of this nature are shell casings in which the nose is arranged to receive a fuse assembly. In such shell casings it is customary to form one or more recesses or notches in the outer peripheral margin of the casing nose so that after the fuse assembly has been mounted thereon portions of the fuse body may be overturned or upset into the recesses or notches to secure the assembly in place.

An object of the invention is to provide a simple, efficient tool for cutting recesses or notches in the peripheral edges of such generally cylindrical articles as shell casings and like articles.

Another object is to provide a new and improved tool of this nature embodying means for associating a cutter operatively with the article to be cut and having means effective during a single operative movement thereof to feed the cutter progressively to full depth of cut.

Another object is to provide in a tool of this nature new and improved means for operatively supporting a rotary cutter for combined cutting and feeding movement into the work during a part of a single rotation, said means permitting the position of the cutter to be shifted so that all of the cutting elements thereon may be used.

Other objects and advantages will become apparent in the following description and from the accompanying drawings in which:

Figure 1 is a side view of a tool embodying the features of the invention.

Fig. 2 is a plan view of the tool.

Fig. 3 is a sectional view on an enlarged scale taken substantially along the line 3—3 of Fig. 2 and illustrating the assembled position of the parts at the beginning of a cutting operation.

Fig. 4 is a view similar to Fig. 3 illustrating the position of the parts at the completion of a cut.

Figure 5:
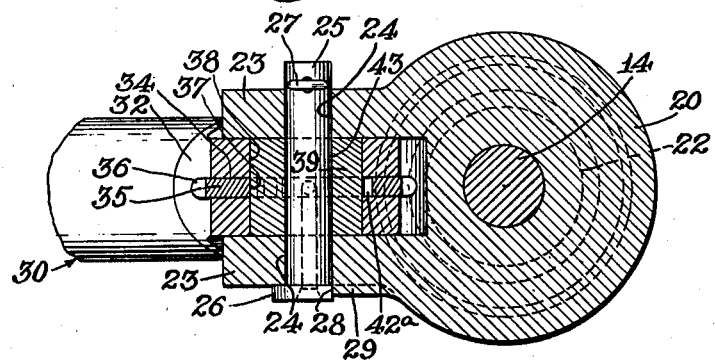
Fig. 5 is a transverse section through the tool taken substantially along the line 5—5 of Fig. 3.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

To facilitate the disclosure of the present invention the exemplary form of tool has been shown and will be described in association with the nose portion of a shell casing. It is to be understood, however, that the tool will operate satisfactorily on other types of casings or comparable articles.

In the drawings the numeral 10 designates a shell casing having a nose portion provided with an axial, internally screw-threaded bore 11. The bore is primarily intended to receive an externally screw-threaded portion of the body of a fuse assembly. The margin of the bore at the end face of the shell is usually flared outwardly, as at 12, to provide a centering seat engageable by a complementary shaped part on the fuse assembly body. Before the fuse assembly is mounted on the shell, one or more recesses or notches are formed in the outer peripheral margin, indicated at 13, on the end face at the nose of the shell casing.

The present tool includes a body structure adapted to be conveniently associated with the nose portion of the shell casing by means of the screw-threaded bore 11 therein and the tool is so dimensioned that when the body thereof is properly associated with the shell casing a rotary cutting element carried by the tool will be accurately located in opposition to the margin 13 to be cut. In the present instance the tool body is preferably a sectional structure comprising an axial stem 14 having a disk 15 pinned, as at 16, to one end thereof. The disk 15 is dimensioned to fit into the bore 11 in the casing nose and is provided with external screw-threads for engagement with the internal screw-threads in the bore. At its opposite end the stem 13 has a hand wheel 17 pinned thereto, as at 18, to facilitate assembly of the disk in the bore. If desired the end of the stem may be extended beyond the hand wheel 17, as indicated at 19, to provide a finger piece by which the stem may be more quickly rotated than with the hand wheel.

The disk 15 and hand wheel 17 are spaced apart and a support 20 for the cutting element, rotatably mounted on the stem 14 therebetween, is held substantially against movement in an axial direction by these parts. The support 20 has approximately the same diametrical dimension as the outer diametrical dimension of the casing nose and the face that engages the end face of the casing nose has a tapered shoulder 21 substantially complemental to the flared surface 12. The engagement between these complemental surfaces insures that the support will be properly centered when it is seated against the end face of the shell nose. To afford clearance the adjoining face of the disk 15 may be annularly grooved, as at 22. The support 20 may, of course, be secured to the stem 14 but relative rotation therebetween is preferred to permit the cutting element to be located at a desired point relative to the shell casing as well as to avoid the necessity of rotating the support and the cutting mechanism about the shell casing during the assembly and disassembly of the tool thereon.

The support 20 of the tool has at one side thereof a pair of outstanding ears 23 (Fig. 5) having bores 24 therein alined in a direction normal to the axis of the stem 14 to receive a removable pivot pin 25. The pin is held in place by a head 26 on one end and by such means as a cotter pin 27 at its other end and rotation thereof is prevented by a flat face 28 on the head 26 engaging a projection 29 formed on one of the ears 23. The cutting mechanism is mounted on the pin between the ears.

The cutting mechanism embodies a comparatively simple arrangement of parts that may be removed from the support 20 as a unit simply by withdrawing the pin 25. In the present instance the cutting mechanism includes a handle member 30 formed in this instance of two sections 31 and 32 which are rigidly secured together, as at 33. The inner one of the sections, herein the section 32, has a diametrical end slot 34 just wide enough snugly to receive a circular cutter 35 peripherally provided with radial cutting teeth 36. In both the cutter and the opposite arms of the handle section 32 are similar axial apertures 37 and 38 respectively to receive a snugly fitting disk 39. A key 40 is arranged to be seated in a groove 41 in the disk 39 and in registering grooves 42 in the cutter and the arms of the handle section (the grooves in the arms cannot be seen in the drawings) to secure the handle, the cutter and the disk together for conjoint movement. The disk 39 is dimensioned to fit without substantial end play between the ears 23 on the support 20 and the disk has a bore 43 therein which is disposed eccentrically of the axis of the disk.

The eccentric disk 39 and the cutter are so dimensioned and their relationship to the handle is so determined that when the handle is at one extreme limit of its movement as shown in Fig. 3 the eccentric disk is disposed to position the cutter at its greatest distance from the nose portion of the shell casing with the teeth of the cutter just clearing the marginal edge 13 to be cut. If the handle is now swung to its opposite limit of movement, as shown in Fig. 4, the teeth of the cutter will be successively moved through a cutting stroke relative to the marginal portion 13 of the casing. Simultaneously the rotation of the eccentric disk 39 about the pin 25 moves the cutter toward the casing thereby feeding the cutter toward the work. Preferably the eccentricity of the disk 39 is such that it will feed the cutter to a desired depth of cut upon movement thereof through approximately one-third of a revolution.

Simple means is provided for permitting all of the teeth of the cutter to be used before resharpening the tool. Thus, as shown in Fig. 3, additional grooves 42ª are provided in the cutter at equal circumferentially spaced intervals. When the teeth along one section of the cutter become dull, it is only necessary to position another of the grooves 42ª, for engagement by the key 40 to present a sharp section of the cutter to the work.

Figure 6:
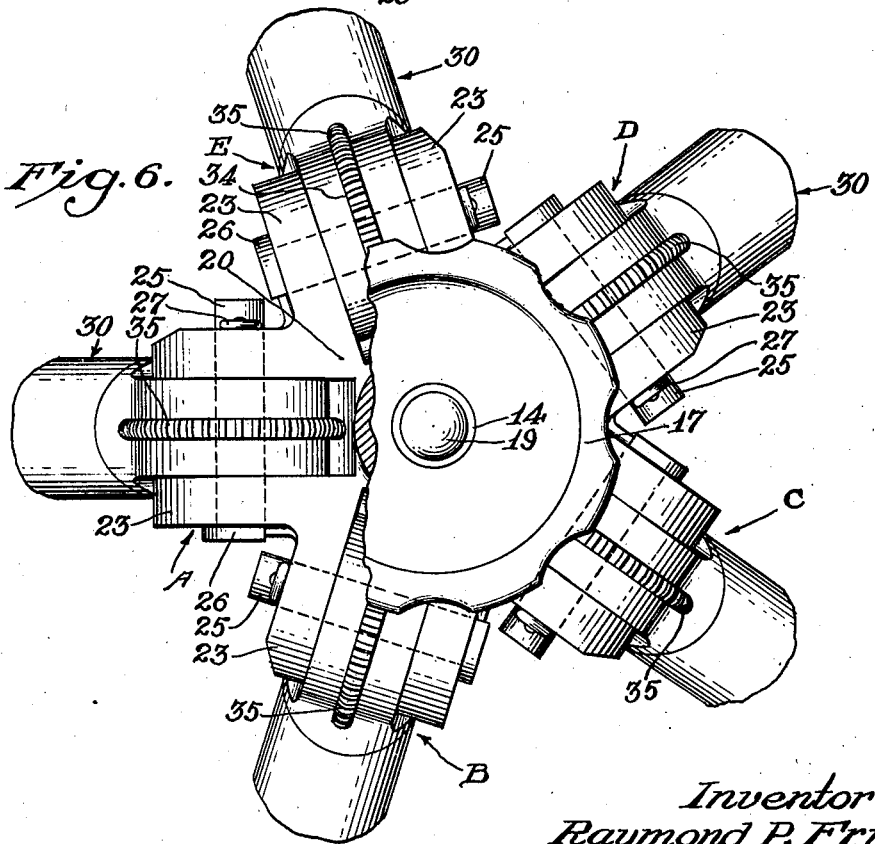
Fig. 6 is a plan view of a modified form of tool.

On some sizes of shells more than one recess or notch is required. It will, of course, be evident that a tool embodying a single cutting mechanism may be employed to cut a series of recesses or notches. Since, however, this would require a repositioning of the cutter relative to the work for each additional cut, the operation of cutting a plurality of recesses or notches may be expedited by providing a plurality of cutting mechanisms on the support 20. Such arrangement is shown in Fig. 6 wherein the support 20 has five sets of ears designated A to E, inclusive, spaced equidistantly about its circumference. Each of the sets of ears operatively supports a cutting mechanism like that previously described. With a tool having multiple cutters it is only necessary to connect the tool with the shell casing and make the required cuts by operating each of the cutting mechanisms.

It will be evident from the foregoing that a novel tool has been provided by which notches or recesses may be cut in the periphery of a shell casing or comparable cylindrical member quickly and efficiently. In the manufacture of shell casings the present tool plays an important part inasmuch as the same notches heretofore have for the most part been cut on machine tools that could well be in use on other work.

I claim as my invention:

1. In a cutting tool of the character described, the combination of a tool body adapted to be mounted on the nose of a shell, a cutter carried by the body and disposed in spaced opposition to the point of cut on the nose when the body is so mounted, and means for moving the cutter through a working stroke including means for simultaneously feeding the cutter into the workpiece progressively to depth of cut.

2. In a cutting tool of the character described, the combination of a tool body having means thereon for securing the tool to a workpiece, a rotatable cutter mounted on said body, and means for rotating said cutter on an axis shiftable by such rotation in a radial direction to simultaneously feed the cutter.

3. In a tool for cutting surface recesses or notches in a workpiece, the combination of a tool body adapted for operative association with a workpiece, tool supporting means on said body disposed to extend into overlying relation to the surface portion of the workpiece to be cut, and cutting mechanism rotatably mounted on said supporting means including a rotary cutter, manipulable means for rotating said cutter through a cutting stroke, and means operable by such rotation to shift said cutter toward the workpiece to full depth of cut.

4. In a tool for cutting surface recesses or notches in a workpiece, the combination of a tool body adapted for operative association with a workpiece, tool supporting means on said body disposed to extend into overlying relation to the surface portion of the workpiece to be cut, and cutting mechanism rotatably mounted on said supporting means including a rotatably and eccentrically supported member, a rotary cutter mounted on said member for rotation therewith, and means for rotating said member and cutter, the eccentric movement of said member being effective during such rotation to feed said cutter progressively toward the workpiece.

5. In a tool for cutting surface recesses or notches in a workpiece, the combination of a tool body adapted for operative association with a workpiece, tool supporting means on said body, and cutting mechanism including a rotatable disk eccentrically mounted on said supporting means, a rotary cutter having radial cutting means, means for securing said cutter to said disk with the cutter radially opposed to the point of cut, and manipulable means for rotating said disk and cutter through a cutting stroke from a position in which said cutting means is spaced from the workpiece to a position in which said cutting means has been advanced into the workpiece to depth of cut.

6. In a tool for cutting surface recesses or notches in a workpiece, the combination of a tool body adapted for operative association with a workpiece, tool supporting means on said body, a rotary cutter, a member supporting said cutter, means for mounting said member on said supporting means for rotation about an eccentrically located axis, means for rotating said member through a portion of a revolution to feed said cutter into the workpiece and traverse said cutter through a cutting stroke, and means for selectively securing said cutter to said member to present different peripheral portions thereof to the workpiece.

7. In a tool for cutting surface recesses or notches in a workpiece, the combination of a tool body adapted for operative association with a workpiece, tool supporting means on said body having projecting means arranged to extend into overlying relation to the surface portion of the workpiece to be cut, pivot means mounted on said projecting means, a member mounted on said pivot means for relative rotation about an eccentric axis, a rotary cutter, a manipulating handle, and means for connecting said handle and cutter to said member.

8. A tool for cutting recesses or notches in a peripheral margin of the nose portion of a shell casing or the like having an axial internally screw-threaded bore in said nose portion comprising, in combination, a tool body having an externally screw-threaded part adapted for engagement with the screw-threads in said bore, a member mounted on said body for eccentric rotation about an axis normal to the axis of said shell casing, a rotary cutter having peripheral cutting elements mounted on said member and arranged in assembly to be disposed opposite to the margin to be cut, the eccentricity of said member being such as to effect movement of said cutter from a position slightly spaced radially outwardly of said marginal portion to an inward depth of cut position, and means for rotating said member and cutter.

9. A tool for cutting recesses or notches in the nose portion of a shell casing or the like having an axial bore in said nose portion comprising, in combination, a tool body, means for operatively associating said tool body with said shell casing including a part on said tool body adapted to interfit with said bore and center said tool body with respect to said shell casing, tool supporting means on said tool body disposed to extend into opposed relation to the surface to be cut, and cutting means rotatably mounted on said supporting means including an eccentrically rotatable cutter, and means for rotating said cutter, the eccentric movement of said cutter being effective during rotation thereof through a part of its circumferential dimension to feed said cutter relative to said nose portion of the shell casing.

10. In a tool for cutting spaced recesses or notches peripherally about a generally cylindrical shaped portion of a workpiece, the combination of a body having means for securing it to said workpiece axially of said portion, a plurality of rotary cutters mounted on said body in circularly spaced relation, and means connected with each of said cutters for rotating the associated cutter through a cutting stroke and simultaneously feeding said cutter toward the workpiece.

RAYMOND P. FRYE.